United States Patent
Urbanczyk et al.

(10) Patent No.: US 9,452,550 B2
(45) Date of Patent: Sep. 27, 2016

(54) EXPANDABLE VINYL AROMATIC POLYMERS COMPRISING PLATELET NEEDLE COKE PARTICLES

(71) Applicant: TOTAL RESEARCH & TECHNOLOGY FELUY, Seneffe (BE)

(72) Inventors: Laetitia Urbanczyk, La Louvière (BE); Stéphane Nowe, Monein (FR); Jacques Michel, Feluy (BE); Jean-Claude Deleye, Herne (BE); Nicolas Lambricht, Louvain-La-Neuve (BE); Philippe Lodefier, Wemmel (BE)

(73) Assignee: Total Research & Technology Feluy, Seneffe (Feluy) (BE)

( * ) Notice: Subject to any disclaimer, the term of this patent is extended or adjusted under 35 U.S.C. 154(b) by 0 days.

(21) Appl. No.: 14/655,305

(22) PCT Filed: Dec. 19, 2013

(86) PCT No.: PCT/EP2013/077405
§ 371 (c)(1),
(2) Date: Jun. 24, 2015

(87) PCT Pub. No.: WO2014/102137
PCT Pub. Date: Jul. 3, 2014

(65) Prior Publication Data
US 2015/0353701 A1    Dec. 10, 2015

(30) Foreign Application Priority Data

Dec. 28, 2012 (EP) .................................... 12199750

(51) Int. Cl.
| | |
|---|---|
| *C08J 9/16* | (2006.01) |
| *C08K 3/04* | (2006.01) |
| *B29B 7/60* | (2006.01) |
| *C08J 9/00* | (2006.01) |
| *B29C 44/34* | (2006.01) |
| *B29B 9/06* | (2006.01) |
| *B29B 7/74* | (2006.01) |
| *B29B 9/12* | (2006.01) |
| *B29B 9/16* | (2006.01) |
| *B29K 25/00* | (2006.01) |
| *B29K 105/04* | (2006.01) |
| *B29K 105/00* | (2006.01) |
| *B29K 105/16* | (2006.01) |
| *B29K 507/04* | (2006.01) |

(52) U.S. Cl.
CPC .............. *B29B 7/60* (2013.01); *B29B 7/7461* (2013.01); *B29B 9/065* (2013.01); *B29B 9/12* (2013.01); *B29B 9/16* (2013.01); *B29C 44/3442* (2013.01); *B29C 44/3461* (2013.01); *C08J 9/0066* (2013.01); *C08J 9/0095* (2013.01); *C08J 9/16* (2013.01); *B29K 2025/06* (2013.01); *B29K 2105/0026* (2013.01); *B29K 2105/04* (2013.01); *B29K 2105/16* (2013.01); *B29K 2507/04* (2013.01); *C08J 2325/04* (2013.01); *C08J 2325/06* (2013.01); *C08J 2491/06* (2013.01)

(58) Field of Classification Search
None
See application file for complete search history.

(56) References Cited

U.S. PATENT DOCUMENTS

| | | | | |
|---|---|---|---|---|
| 7,284,611 B2* | 10/2007 | Reddy | ..................... | C09K 8/16 166/292 |
| 7,875,345 B1* | 1/2011 | Simpson | ................. | B29C 44/12 264/429 |
| 8,568,632 B2* | 10/2013 | Rynd | ..................... | B82Y 30/00 264/211 |
| 2010/0197828 A1* | 8/2010 | Whaley | ..................... | C08J 3/226 523/351 |
| 2011/0046249 A1 | 2/2011 | Ponticiello et al. | | |
| 2011/0213045 A1 | 9/2011 | Handl | | |
| 2012/0074347 A1* | 3/2012 | Gordon-Duffy | ....... | C08J 9/0019 252/62 |

FOREIGN PATENT DOCUMENTS

| | | |
|---|---|---|
| EP | 0372343 A1 | 6/1990 |
| EP | 620246 A1 | 10/1994 |
| EP | 0915127 A2 | 5/1999 |
| EP | 1486530 A1 | 12/2004 |
| EP | 2274370 B1 | 8/2012 |
| EP | 2358798 B1 | 2/2015 |
| WO | 9745477 A1 | 12/1997 |
| WO | 2004087798 A1 | 10/2004 |
| WO | 2010128369 A1 | 11/2010 |
| WO | 2011007228 A2 | 1/2011 |
| WO | 2011042800 A1 | 4/2011 |
| WO | 2011110333 A1 | 9/2011 |
| WO | 2012175345 A1 | 12/2012 |

OTHER PUBLICATIONS

International Search Report issued in International Application No. PCT/EP2013/077405, dated Mar. 25, 2015 (3 pages).
E. Fitzer, K.-H. Kochling, H. P. Boehm and H. Marsh, "International Union of Pure and Applied Chemistry—Recommended Terminology for the Description of Carbon as a Solid", Pure Appl. Chem., 1995, vol. 67, No. 3, pp. 473-506.

* cited by examiner

Primary Examiner — Kara Boyle
(74) Attorney, Agent, or Firm — Albert Shung

(57) ABSTRACT

Expandable vinyl aromatic polymers may contain comminuted needle petroleum coke with a polymodal particle size distribution. Foams obtained from such expandable vinyl aromatic polymers have a reduced thermal conductivity at a reduced foam density.

19 Claims, 3 Drawing Sheets

EXPANDABLE VINYL AROMATIC POLYMERS COMPRISING PLATELET NEEDLE COKE PARTICLES

CROSS-REFERENCE TO RELATED APPLICATIONS

Figure 1:
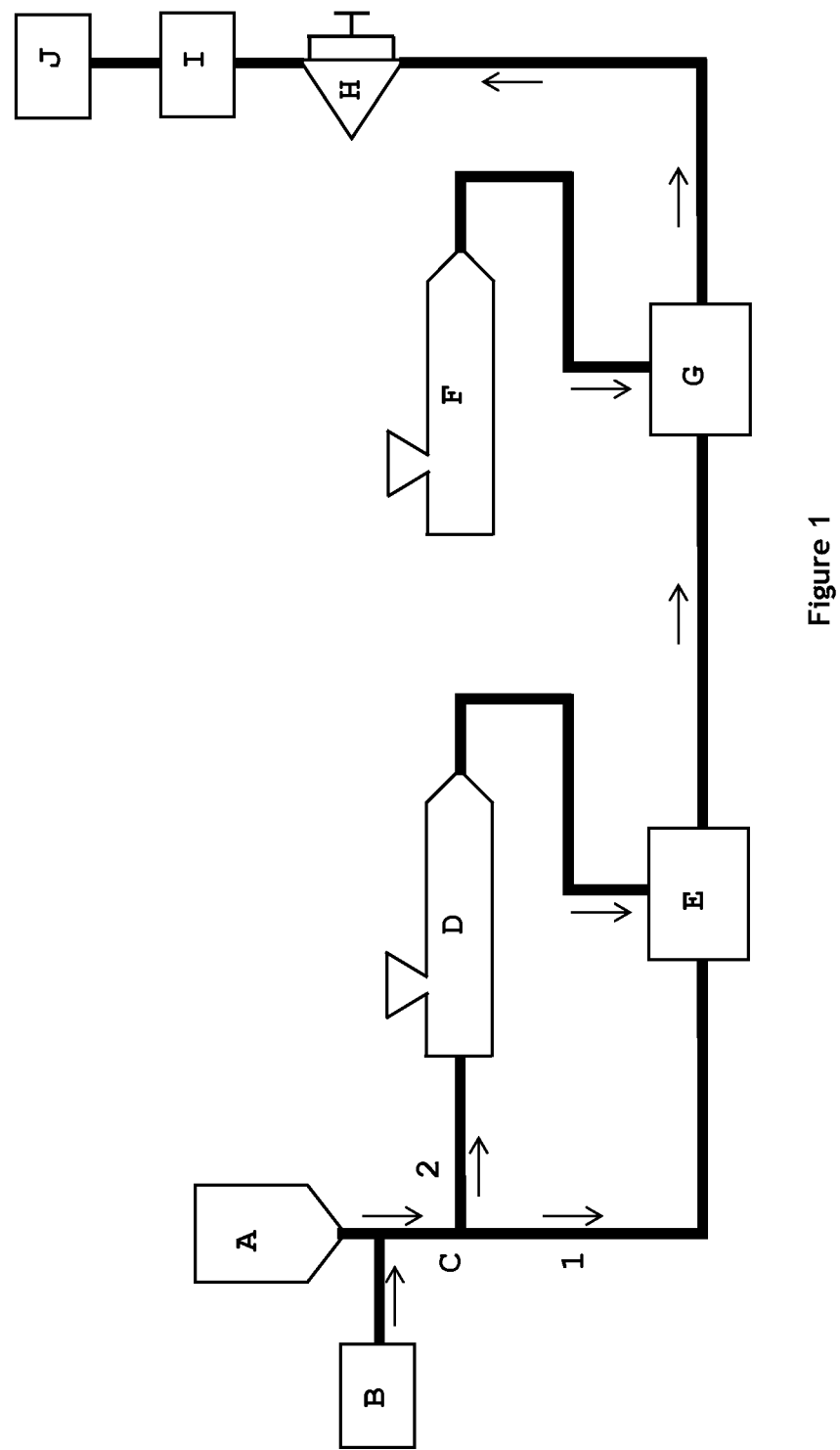

This application is a National Stage Entry of PCT/EP2013/077405, filed on Dec. 19, 2013, which claims priority from EP 12199750.6, filed on Dec. 28, 2012. The entirety of both PCT/EP2013/077405 and EP 12199750.6 are incorporated herein by reference.

FIELD OF THE INVENTION

The present invention relates to particulate expandable vinyl aromatic polymers containing polymodal comminuted platelet athermanous particles, in particular petroleum coke, their production and foams produced therefrom.

STATE OF THE ART

Expanded vinyl aromatic foams, in particular polystyrene foams have been known for a long time and have numerous applications in many fields. Such foams are produced by heating polystyrene particles impregnated with blowing agents to achieve an expansion in a mold where the expanded particles are welded together to achieve molded parts. A significant application area of such molded panels is thermal insulation in building and construction. Without any athermanous additives panels of expanded polystyrene foams have a minimum thermal conductivity at densities around 30 Kg/m$^3$. To save material, it is nevertheless desirable to use foam boards having lower densities, in particular 15 kg/m$^3$ or even less for thermal insulation. The production of such foams is not a problem in technical terms. However, without athermanous particles, such foam boards have a drastically worse thermal insulation performance so that they do not meet the requirements for thermal conductivity. The thermal conductivity usually exceeds 36 mW/m·K.; typically a thermal conductivity of 36 and 38 mW/m·K can be achieved with a foam density around 14 and 18 g/l, respectively.

It is known that the thermal conductivity of foams can be reduced by incorporation of athermanous materials such as carbon black, coke, graphite, metal oxides, metal powder or pigments.

European patent EP 1 486 530 relates to expandable polystyrene which can be processed into a foam having a fine cell structure and a low density and which, in order to improve the thermal insulation value thereof, contains a thermal insulation value-increasing material. The thermal insulation value-increasing material is active carbon with a particle size of less than or equal to 12 μm and is present in an amount of from 1 to 15% by weight, based on the amount of styrene polymer.

European patent EP 372 343 describes polystyrene foams containing from 1 to 25% by weight of carbon black. The carbon black has a particle size of from 10 to 100 nm and a surface area of from 10 to 1500 m$^2$/g. The polystyrene foams described there are predominantly produced by extrusion-expansion and preferably have a density of 32-40 kg/m$^3$, which is typical for these foams.

International patent application WO 2004087798 discloses expandable vinylaromatic polymers comprising: a) a matrix obtained by polymerizing 50 to 100% by weight of one or more vinyl aromatic monomers and 0 to 50% by weight of a copolymerizable monomer; b) 1 to 10% by weight, calculated with respect to the polymer of an expanding agent enclosed in the polymeric matrix; c) 0.01 to 20% by weight, calculated with respect to the polymer of carbon black distributed in the polymeric matrix having an average diameter ranging from 30 to 2000 nm, a surface area ranging from 5 to 40 m$^2$/g, a sulfur content ranging from 0.1 to 2000 ppm and an ash content ranging from 0.001 to 1%.

European patent application EP 902 804 discloses expandable styrene polymers, in particle form, containing 0.05 to 25% by weight, relative to the weight of the polymer, of carbon black uniformly distributed throughout the polymer, the polymers being processable to give self-extinguishing cellular materials with a density of 35 kg/m$^3$.

European patent EP 620 246 describes moldings made of expanded polystyrene foam which contain a particulate athermanous material, in particular carbon black, and also graphite. The density of the moldings is less than 20 kg/m$^3$. The particles are preferably incorporated into the moldings by surface coating of the prefoamed polystyrene beads or by embedding into the not yet foamed polystyrene granules.

European patent EP 0 915 127 discloses expandable polystyrene containing between 0.05 and 25% by weight athermanous particles, more particularly graphite with a particle size between 2.5 and 12 μm, in a homogeneous distribution whereby the expandable polystyrene particles are coated with 0.001 to 0.5% by weight of a hydrophobic agent. The expandable polystyrene is produced by mixing athermanous particles, blowing agent and molten polystyrene in an extruder followed by extruding, cooling and granulating. The polystyrene foam, prepared from the expandable polystyrene by foaming, has a density≤35 kg/m$^3$.

International patent application WO 2011042800 discloses nanocomposite compositions based on expandable thermoplastic polymers which comprise: a) a polymeric matrix produced by the polymerization of one or more vinyl and vinyl aromatic monomers; b) 1 to 10% by weight, calculated with respect to the polymer of a blowing agent enclosed in the polymeric matrix; c) 0.004 to 15% by weight, calculated with respect to the polymer of an athermanous filler comprising nano-scaled graphene plates with a thickness (orthogonal to the graphene sheet) not greater than 150 nm, an average dimension (length, width, or diameter) not greater than 10 μm and a surface area>50 m$^2$/g.

European patent application EP 2 358 798 discloses expandable vinyl aromatic polymers comprising a matrix obtained by polymerizing 50 to 100% by weight of one or more vinyl aromatic monomers and 0 to 50% by weight of at least one co-polymerizable monomer; 1 to 10% by weight, calculated with respect to polymer, of an expanding agent embedded in the polymeric matrix; 0 to 25% by weight, calculated with respect to polymer, of a filler comprising carbon coke having an average diameter of between 0.5 and 100 μm, with a surface area, measured according to ASTM D-3037/89, ranging from 5 to 200 m$^2$/g; 0.05 to 10% by weight, calculated with respect to polymer, of expanded graphite in particle form, with a particle average diameter (size) ranging from 1 to 30 μm, a surface area, measured according to ASTM D-3037/89, ranging from 5 to 500 m$^2$/g and a density ranging from 1.5 to 5 g/cm$^3$.

European patent application EP 2 427 514 discloses thermo-insulating expanded articles with improved resistance to solar irradiation, which comprise an expanded polymeric matrix, obtained by expansion and sintering of beads/granules of a vinyl aromatic (co)polymer, in whose interior a filler is homogeneously dispersed, which comprises from 0.1 to 10% by weight of at least one athermanous material selected from coke, graphite and carbon black and optionally from 0 to 10% by weight of an inorganic additive, active within the wave-lengths ranging from 100 to 20,000 cm$^{-1}$. The polymeric matrix comprises a copolymer of styrene and at least one vinyl aromatic comonomer substituted in the ring or on the vinyl group and/or a mixture of polystyrene and up to 10% by weight, with respect to the mixture, of a thermoplastic polymer compatible with polystyrene and having a glass transition temperature above 100° C.

European patent EP 2 274 370 discloses expandable vinyl aromatic polymers which comprise a matrix obtained by polymerizing 50 to 100% by weight of one or more vinyl aromatic monomers and 0 to 50% by weight of at least one copolymerizable monomer; 1 to 10% by weight, calculated with respect to the polymer, of an expanding agent enclosed in the polymeric matrix; 0.05 to 25% by weight, calculated with respect to the polymer (a), of a filler comprising coke with a surface area, measured according to ASTM D-3037/89, ranging from 5 to 50 m$^2$/g.

European patent application EP 2 454 313 discloses thermo-insulating expanded articles having a density ranging from 5 to 50 g/l, which can be obtained from particle compositions of expandable vinyl aromatic polymers comprising from 10 to 90% by weight of beads/granules of expandable vinyl aromatic polymer pigmented with an athermanous material comprising from 0.05 to 25% by weight of coke in particle form with an average particle diameter ranging from 0.5 to 100 μm and from 90 to 10% by weight of beads/granules of essentially white expandable vinyl aromatic polymer.

US 2011/213045 patent application relates to a molded body made of polystyrene, particularly polystyrene particle foam or polystyrene hard foam, wherein the polystyrene, particularly the polystyrene particle foam or the polystyrene hard foam, comprises petroleum coke, particularly petroleum coke particles. Both, grain shape and grain size are important for infrared blocker. The preferred petroleum coke is anisotropic coke. In particular a platelet grain shape, produced by delamination mills, and with a grain size in the range between 1 and 50 μm, is preferred. The petroleum coke is used at an amount comprised between 0.5 and 10% by weight with respect to the weight of the finished body. The body comprising the petroleum coke is characterized by a thermal conductivity which is reduced by 25 to 35% compared to the thermal conductivity of the body without the petroleum coke.

International patent application WO 2011110333 relates to building material having thermally insulating properties, wherein the building material contains particles (1) of petroleum coke, in particular calcined petroleum coke, and the building material is a nonmetallic inorganic material and/or a natural material and/or a synthetic polymer apart from polystyrene. The particular calcined petroleum coke may be isotropic or may have a platelet-like shape, both characterized by a specific surface comprised between 3 and 50 m$^2$/g, an aspect ratio comprised between 1 and 500 and a particle size comprised between 1 and 50 μm. The petroleum coke particles are used in an amount comprised between 0.05 and 10% by weight with respect to the weight of the finished body.

Up until now, most athermanous materials introduced in expandable styrene polymers in order to reduce the thermal conductivity of the expanded styrene polymers suffer from one or more limitations and/or drawbacks. The interaction between athermanous additives and foams is complex. Without being limitative, one can mention the interaction of the athermanous material with the flame retardant and/or its synergist as a major issue since higher amounts of flame retardant have some times to be introduced in the expandable styrene polymer in order to be endowed with fire resistance properties that enable to have a good rating (B1 or B2) according to the DIN 4102-1 test. All athermanous additives have a certain influence on the cell formation and thus on expansion capabilities, density and open cell rate which again influences fire resistance and thermal conductivity.

Without contesting the associated advantages of the state of the art systems, it is nevertheless obvious that there is still a need for expandable vinyl aromatic polymers, in particular styrene polymers that do not show any of the existing shortcomings.

AIMS OF THE INVENTION

The present invention aims to provide expandable vinyl aromatic polymers that do not present the drawbacks of the state of the art, in other words to provide expandable vinyl aromatic polymers enabling the production of expanded beads allowing molded parts such as insulation panels with an improved fire resistance and a reduced thermal conductivity obtained in an economically attractive and a safe way.

FIGURES

FIG. 1 represents a flow-sheet for the production of expandable vinyl aromatic polymer wherein:
(A) is the polymerization reactor producing the main polymer stream;
(B) is the unit for the addition of blowing agent, preferably n-pentane and/or isopentane, to the main polymer stream;
(C) is the branching point where a polymer side stream (2) is derived from the main polymer stream (1);
(D) is the mixing unit, preferably an extruder, where comminuted needle petroleum coke particles and foam cell regulator, preferably talc and wax are dispersed in the derived polymer stream (2);
(E) is the merging point where both polymer streams (1; 2) join through a static mixer;
(F) is the extruder where flame retardant agent and synergist are blended with vinyl aromatic polymer before being fed into the main polymer stream through (G) to form the expandable vinyl aromatic polymer melt;
(H) is the under-water pelletizing unit;
(I) is the drying unit;
(J) is the packaging unit.

Figure 2:
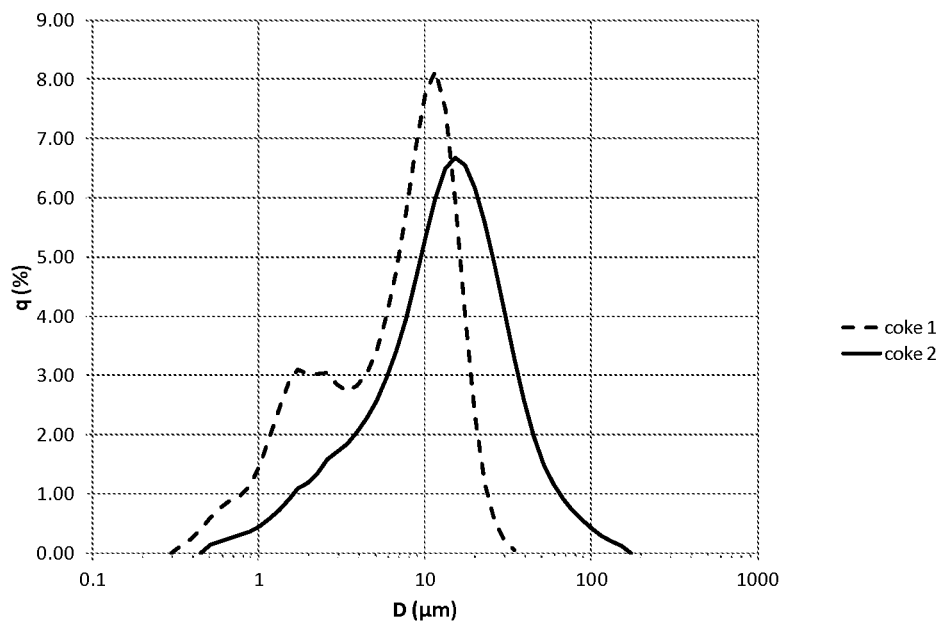

FIG. 2 represents the particle size distribution of two types of coke, after grinding and before mixing into the polymer matrix, wherein coke 1 is Mechano Rem 5 (H.C. Carbon GmbH) with a median diameter of 6.7 μm (dashed line) and coke 2 is Timcal PC 40 (Imerys) with a median diameter of 12.6 μm (continuous line).

Figure 3:
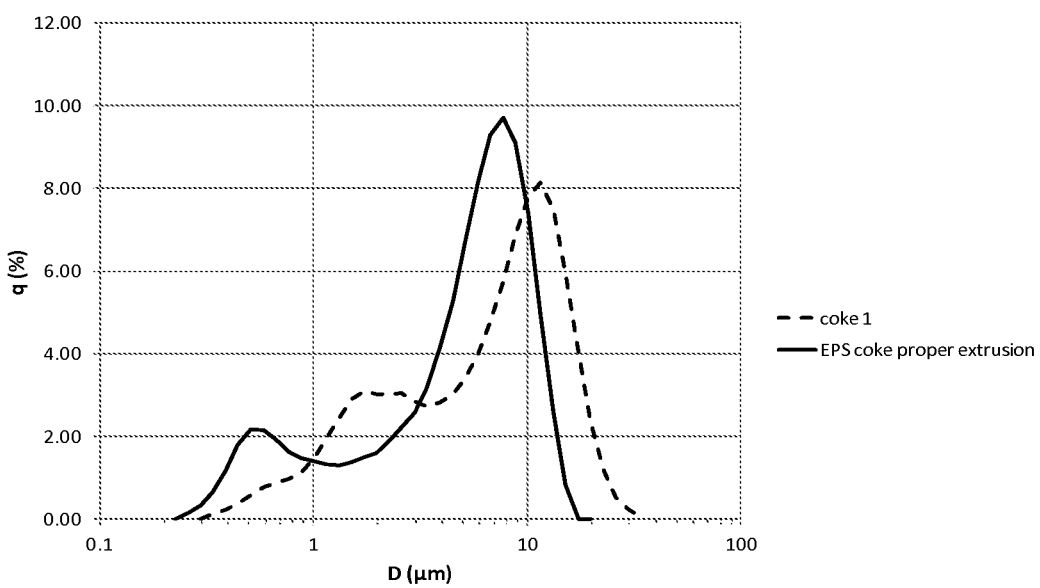

FIG. 3 represents the particle size distribution for coke 1, as obtained from the laser light scattering granulometry technique (HORIBA 920), wherein q (%) represents the volume percentage of the apparent diameter and D(μm) represents the apparent diameter of the particle. In this figure the dashed line represents the particle size distribution for coke 1, after grinding; the continuous line represents the particle size distribution for coke 1 after dispersion into the polymer matrix, by addition into the molten polymer stream and measured on the expandable beads.

Figure 4:
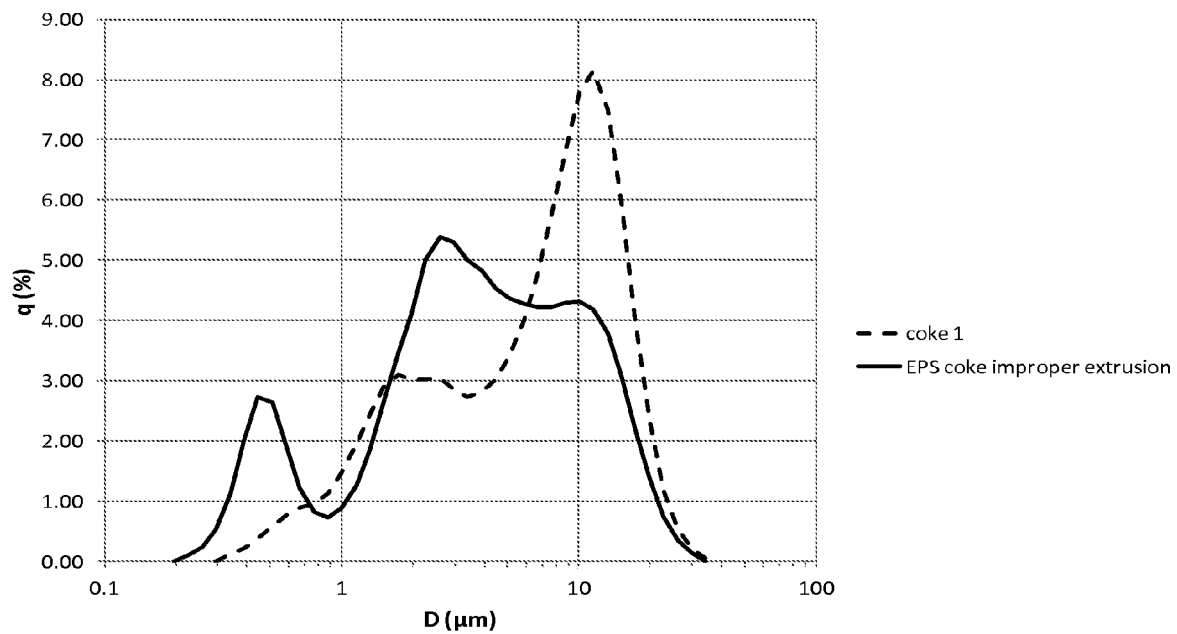

FIG. 4 represents the particle size distribution for coke 1, as obtained from the laser light scattering granulometry technique (HORIBA 920), wherein q (%) represents the volume percentage of the apparent diameter and D(μm) represents the apparent diameter of the particle. In this figure the dashed line represents the particle size distribution for coke 1, after grinding; the continuous line represents the particle size distribution for coke 1 after improper extrusion, thus extrusion of the polymer-coke mix wherein the polymer is in a non-molten state.

DEFINITIONS

Polymodal particle size distribution should be understood as a particle size distribution which has more than one mode, i.e. more than one distinct peak (for instance two, three of four peaks) in the graph representing the particle size versus the relative abundance at each size.

Trimodal particle size distribution should be understood as a particle size distribution which has three modes, i.e. three distinct peaks in the graph representing the particle size versus the relative abundance at each size.

Bimodal particle size distribution should be understood as a particle size distribution which has two modes, i.e. two distinct peaks in the graph representing the particle size versus the relative abundance at each size.

Aspect ratio should be understood as the ratio of the average diameter to the average thickness of the particles.

Particle diameter should be understood as the apparent volume diameter as obtained from the laser light scattering granulometry technique (HORIBA 920).

Carbon-based athermanous particles are for example graphite, graphene, carbon black, coke, carbon nanotubes, in various allotropic forms, wherein only graphite, graphene and coke are platelet.

Coke should be understood as defined by "E. Fitzer, K.-H. Köchling, H. P. Boehm and H. Marsh in *International Union of Pure and Applied Chemistry—Recommended Terminology for the Description of Carbon as a Solid—Pure & Applied Chemistry*, Vol. 67, No. 3, pp. 485 and 498" as a solid high in content of the element carbon and structurally in the non-graphitic state. It is produced by pyrolysis of organic material which has passed, at least in part, through a liquid or liquid-crystalline state during the carbonization process. Coke can contain mineral matter. Non graphitic carbons are all varieties of solids consisting mainly of the element carbon with two-dimensional long-range order of the carbon atoms in planar hexagonal networks, but without any measurable crystallographic order in the third direction (c-direction) apart from more or less parallel stacking.

SUMMARY OF THE INVENTION

The present invention discloses expandable vinyl aromatic polymers comprising platelet needle coke particles having a polymodal particle size distribution wherein (about) 45% or more of the total amount of particles has a diameter comprised between (about) 3 μm and (about) 20 μm and wherein (about) 40% or less of the total amount of particles has a diameter of less than (about) 3 μm.

Preferred embodiments of the present invention disclose one or more of the following features:
(about) 60% or more of the total amount of coke particles has a diameter comprised between (about) 3 μm and (about) 20 μm and (about) 35% or less of the total amount of coke particles has a diameter of less than (about) 3 μm;
the polymodal particle size distribution of the platelet needle coke particles is a bimodal or a trimodal distribution;
the platelet needle coke particles in the bimodal or trimodal particle size distribution are characterized by a BET of (about) 20 $m^2$/g or less, preferably of (about) 10 $m^2$/g or less and more preferably of (about) 5 $m^2$/g or less according to ASTM D-3037-93;
the platelet needle coke has an aspect ratio comprised between (about) 1 and (about) 200, preferably between (about) 5 and (about) 100 more preferably between (about) 5 and (about) 50;
the expandable vinyl aromatic polymers comprise between (about) 1 and (about) 10% by weight, preferably between (about) 2 and (about) 6% by weight of platelet needle coke having a polymodal particle size distribution;
the expandable vinyl aromatic polymers comprise between (about) 0.2 and (about) 25% by weight of flame retardant agent, between (about) 2 and (about) 10% by weight of blowing agent and between (about) 0.01 and (about) 5% by weight of foam cell regulator;
the expandable vinyl aromatic polymers comprise between (about) 0.2 and (about) 25% by weight, preferably between (about) 1 and (about) 15% by weight of flame retardant agent, between (about) 2 and (about) 10% by weight, preferably between (about) 3 and (about) 7% by weight of blowing agent, between (about) 0.1 and (about) 1%, preferably between (about) 0.1 and (about) 0.5% by weight of wax and between (about) 0.25 and (about) 3% by weight, preferably between (about) 0.2 and (about) 2.0% by weight of talc;
the beads or granules of the expandable vinyl aromatic polymer are prepared according to the process comprising the steps of:
a) producing a main polymer melt stream after the polymerization process of the vinyl aromatic polymer;
b) introducing a blowing agent into said main polymer melt stream;
c) deriving a part of said main polymer stream and creating a side loop with an additional polymer melt stream;
d) dispersing the platelet needle coke particles and foam cell regulator into said additional polymer melt stream;
e) joining the additional polymer stream and the main stream to form a new main polymer melt stream;
f) introducing the flame retardant agent and the synergist into the new main polymer melt stream;
g) cooling the polymer melt comprising all ingredients down to a temperature lower than (about) 180° C.;
h) discharging through a die plate with holes and pelletizing the melt under water;
between (about) 10 and (about) 30% of the main polymer stream is derived in step c) to form the additional polymer stream;
the platelet needle coke particles and foam cell regulator, preferably talc and wax, are dispersed in the additional polymer stream in step d) by means of an extruder;
the flame retardant agent and synergist are blended, in a separate extruder, with vinyl aromatic polymer before being introduced in the new main polymer melt stream, in step f) comprising platelet needle coke particles and foam cell regulator, preferably talc and wax;

the present invention further discloses polymer foams obtained from the expandable vinyl aromatic polymers of the present invention.

DETAILED DESCRIPTION OF THE INVENTION

It is an object of the present invention to provide expandable vinyl aromatic polymers, in particular styrene polymers containing petroleum coke particles which can be processed to expanded foams which have both a low density and a low thermal conductivity and have good processing properties, good physical properties and, in particular, very good flame retardant properties.

We have found that this object is achieved by particulate, expandable vinyl aromatic polymers, in particular styrene polymers, containing homogeneously distributed needle petroleum coke particles, characterized by a polymodal particle size distribution with a diameter comprised between (about) 0.1 and (about) 50 µm, preferably between (about) 0.1 and (about) 35 µm. The expandable vinyl aromatic polymers, in particular styrene polymers, thus obtained, can be processed to foams with a density of less than (about) 20 kg/m$^3$, preferably less than (about) 16 kg/m$^3$ characterized by a thermal conductivity less than (about) 36 mW/m·K and preferably less than (about) 34 mW/m·K (in accordance to DIN 52612) and self-extinguishing properties to pass the burning test B2 (in accordance with DIN 4102).

Expandable vinyl aromatic polymers, in particular styrene polymers are vinyl aromatic polymers comprising blowing agent, preferably n-pentane and/or isopentane. The size of the expandable polymer beads is preferably in the range from (about) 0.2 to (about) 2 mm, preferably from (about) 1 to (about) 1.5 mm. Molded polymer foams can be obtained via prefoaming and sintering of the appropriate expandable vinyl aromatic polymer beads, in particular of the styrene polymer beads.

The vinyl aromatic polymers preferably used in the present invention comprise glass-clear polystyrene (GPPS), impact-resistant polystyrene (HIPS), anionically polymerized polystyrene or impact-resistant polystyrene (AIPS), styrene-.alpha.-methylstyrene copolymers, acrylonitrile-butadiene-styrene polymers (ABS), styrene-acrylonitrile polymer (SAN), acrylonitrile-styrene-acrylate (ASA), styrene acrylates, such as styrene-methyl acrylate (SMA) and styrene-methyl methacrylate (SMMA), methyl methacrylate-butadiene-styrene (MBS), methyl methacrylate-acrylonitrile-butadiene-styrene (MABS) polymers, styrene-N-phenylmaleimide copolymers (SPMI) or a mixture thereof, or a mixture of the above-mentioned styrene polymers with polyolefins, such as polyethylene or polypropylene, and polyphenylene ether (PPE).

The weight average molecular weight of the expandable vinyl aromatic polymers, in particular styrene polymers, of the present invention is preferably in the range from (about) 120 kDa to (about) 400 kDa, particularly preferably in the range from (about) 160 kDa to (about) 300 kDa, measured by means of gel permeation chromatography against polystyrene standards. The molar mass of the expandable vinyl aromatic polymers, in particular styrene polymers, in the extrusion processes is generally below the molar mass of the vinyl aromatic polymers, in particular of the polystyrene, used, by (about) 10 kDa, because of the degradation of molar mass caused by shear and/or by heat.

The above-mentioned vinyl aromatic polymers, in particular styrene polymers, can be blended with thermoplastic polymers, such as polyamides (PA), polyolefins, e.g. polypropylene (PP) or polyethylene (PE), polyacrylates, e.g. polymethyl methacrylate (PMMA), polycarbonate (PC), polyesters, e.g. polyethylene terephthalate (PET) or polybutylene terephthalate (PBT), polyether sulfones (PES), polyether ketones, or polyether sulfides (PES), or a mixture thereof, generally in total proportions of up to at most (about) 30% by weight, preferably in the range from (about) 1 to (about) 10% by weight, based on the polymer melt, in order to improve mechanical properties or heat resistance, optionally with use of compatibilizers. Mixtures within the abovementioned ranges of amounts are also possible with, for example, hydrophobically modified or functionalized polymers or oligomers, rubbers, e.g. polyacrylates or polydienes, for example styrene-butadiene block copolymers, or biodegradable aliphatic or aliphatic/aromatic copolyesters.

The petroleum coke used with the expandable vinyl aromatic polymers, in particular with the styrene polymers of the present invention is obtained from grinding coke, preferably anisotropic coke, the so-called needle coke preferably in a delamination mill such as for example an air jet mill and preferably a spiral flow mill. Grinding is performed in such a way that a particle size distribution, as determined by the laser light scattering granulometry technique, with a diameter comprised between (about) 0.1 and (about) 50 µm, preferably between (about) 0.1 and (about) 35 µm is obtained.

The technique of laser diffraction is based on the principle that particles passing through a laser beam will scatter light at an angle that is directly related to their size: large particles scatter at low angles, whereas small particles scatter at high angles. The laser diffraction is accurately described by the Fraunhofer approximation and the Mie theory, with the assumption of spherical particle morphology.

Concentrated suspensions, comprising about 1.0% by weight of carbon based particles, are prepared, using suitable wetting and/or dispersing agents.

Suitable solvents are for example water or organic solvents such as for example ethanol, isopropanol, octane or methyl ethyl ketone. A sample presentation system ensures that the material under test passes through the laser beam as a homogeneous stream of particles in a known, reproducible state of dispersion.

The particle size distribution has been measured by laser light scattering using the particle size analyzer (HORIBA 920) from (Horiba Scientific). The samples were suspended in methyl ethyl ketone at a concentration of about 1% weight, without the use of ultrasonication.

The comminuted needle petroleum coke, obtained after grinding, preferably used in the present invention, is characterized in that (about) 50% or more, preferably (about) 65% or more of the total amount of the particles prove a diameter comprised between (about) 3 µm and (about) 20 µm while (about) 40% or less, preferably (about) 35% or less, of the total amount of the particles has a diameter of less than (about) 3 µm (FIG. 2).

The petroleum coke used in the present invention is a residue of petroleum distillation and is produced in so-called crackers. The petroleum coke is liberated from the volatile components through calcination, as a result of which a carbon with a degree of purity of about 99% is obtained. Therefore, coke may be regarded as a carbon, but is not included in the allotropic forms. Calcined petroleum coke is neither graphite nor can it be included in the amorphous carbons, like carbon black.

The petroleum coke used in the invention exhibit a high aspect ratio. The comminuted needle petroleum coke used within the scope of the present invention is characterized by an aspect ratio between (about) 1 and (about) 200, preferably between (about) 5 and (about) 100 more preferably between (about) 5 and (about) 50.

The comminuted needle petroleum coke of the invention is further characterized by a BET specific surface (according to the Brunauer-Emmett-Teller Surface Area Analysis) (according to ASTM D3037-93) of (about) 20 m$^2$/g or less, preferably of (about) 15 m$^2$/g or less and more preferably of (about) 10 m$^2$/g or less, most preferably (about) 5 m$^2$/g or less.

It has been demonstrated that extrusion conditions of the vinyl aromatic polymer, in particular the styrene polymer, comprising the comminuted needle petroleum coke and optionally other components used for the production of expandable vinyl aromatic polymers are the key for the thermal conductivity reduction capabilities of the incorporated comminuted needle petroleum coke particles.

It has been observed that particular soft extrusion conditions (dispersion into the polymer matrix, by addition into the molten polymer stream) to a large extent improves the delamination of the comminuted needle petroleum coke, while further fragmentation is hardly observed. On the other hand, deviation from these specific extrusion conditions (extrusion of the polymer-coke mix wherein the polymer is in a non-molten state) causes mostly fragmentation of the comminuted needle petroleum coke particles meanwhile delamination is observed to a lesser extent.

Using OCS (Optical Control System) it has been demonstrated that there is less gel-formation in the vinyl aromatic polymer, when prepared according to proper extrusion conditions. These gels, in general having a diameter of (about) 100 μm or more, result from the agglomeration of the small coke particles. Contrary to the small coke particles, these agglomerates do not reflect Infrared irradiation, thus negatively influencing the insulation properties of the derived foam panels.

Further it has been observed that the presence of gels has a negative influence on the proportion of closed cells in the foam, once more negatively influencing the insulation properties of the foam.

It has been demonstrated that improper dispersion conditions result in a gel-formation that is about ten times that of using proper dispersion conditions easily reached by dispersing the athermanous particles directly into the molten polymer matrix.

Thus, within the scope of the present invention, it has been observed that the dispersion of the comminuted needle petroleum coke particles directly into the molten polymer matrix generates so called proper dispersion conditions (for example extrusion conditions) of the vinyl aromatic polymer comprising the comminuted needle petroleum coke and optionally other components used for the production of expandable vinyl aromatic polymers. Such proper dispersion conditions result in petroleum coke with a polymodal particle size distribution characterized in that (about) 45% or more, preferably (about) 60% or more of the total amount of particles have a diameter comprised between (about) 3 μm and (about) 20 μm, whereas (about) 40% or less, preferably (about) 35% or less of the total amount of particles have a diameter of less than (about) 3 μm.

The particle size distribution has been measured by laser light scattering using the particle size analyzer (HORIBA 920) from (Horiba Scientific).

The measurement method is analogous to the protocol used for the determination of the apparent diameter of styrene-butadiene-styrene particles in High Impact Polystyrene (HIPS).

Concentrated suspensions of carbon-based particles, are prepared in methyl ethyl ketone at a concentration of about 1% by weight, without the use of ultrasonication. The expandable vinyl aromatic polymer particles are dissolved in the solvent while the carbon-based particles are dispersed; the dissolution time is about 30 minutes.

Foams with a density of less than (about) 20 kg/m$^3$ and sometimes less than (about) 16 kg/m$^3$ obtained from the expansion and molding of expandable polystyrene (EPS) obtained from the above proper extrusion conditions are characterized by a thermal conductivity of (about) 34 mW/m·K or less.

On the contrary improper dispersion conditions, for example where solid polymer and comminuted needle petroleum coke particles are mixed and molten in the same step in an extruder, result in a too high degree of fragmentation of the comminuted needle petroleum coke causing an increase of the volume percentage of particles with a diameter of less than (about) 3 μm, while the volume percentage of particles with a diameter between (about) 3 μm and (about) 20 μm decreases.

Foams with a density of less than (about) 20 kg/m$^3$ and obtained from expanded EPS particles obtained according to the above improper dispersion conditions of the comminuted needle petroleum coke particles are characterized by a thermal conductivity of more than (about) 36 mW/m·K.

In the manufacturing process of the present invention, the vinyl aromatic polymer, in particular the styrene polymer, leaves the polymerization reactor in a molten state. The obtained melt stream is then divided in a main polymer melt stream and the additional polymer melt stream (side stream).

The additional polymer melt stream is deviated to a dynamic or a static mixing equipment, preferably an extruder, where the comminuted needle petroleum coke and foam cell regulator are fed to and dispersed in the polymer melt, whereupon the additional polymer melt stream recombines with the main polymer melt stream to result in a polymer melt comprising, with respect to the overall weight of the resulting polymer melt, between (about) 1 and (about) 10% by weight, preferably between (about) 2 and (about) 6% by weight of comminuted needle petroleum coke in the bimodal or trimodal particle size distribution and between (about) 0.01 and (about) 5% by weight and preferable between (about) 0.15 and (about) 3.5% by weight of foam cell regulator.

Various kinds of cell regulators working according to various mechanism are known in the field of polymer foams. Inert particles at polymer melt temperatures such as talc; titanium dioxide; clays such as kaolin; silicagel; calcium polysilicate; gypsum; metal particles; calcium carbonate; calcium sulfate; magnesium carbonate; magnesium hydroxide; magnesium sulfate; barium sulfate; diatomaceous earth; nano-particles such as nano-particles of calcium carbonate, nano clay and nano-graphite work by adsorbing microscopic (mainly liquid) blowing agent particles and improving the dispersion of those particles in the polymer matrix.

Other cell regulators, called chemical cell regulators, such as citric acid, sodium bicarbonate or other salts with decomposition temperatures in the range of the polymer melt temperatures work as bubble initiators in the polymer matrix trough the decomposition of the salt releasing CO2.

Finally various molecules, the so-called nucleating agents, are also known as cell regulators as they influence the cristallinity of a polymer and thereby the solubility of the blowing agent (n-pentane/iso-pentane) in the polymer matrix. Typical products considered as nucleating agents, in particular for semi crystalline or crystalline polymers are esters of abietic acids, polyoxyethylene sorbitan monolaurate, Montan wax, Candelilla wax, Carnauba wax, Paraffine wax, Ceresine wax, Japan wax, Petrolite wax, Ceramer wax, polyethylene wax, polypropylene wax and mixtures thereof.

A foam cell regulator of particular interest within the scope of the present invention comprises a mixture of talc and polyethylene wax.

Examples of polyethylene wax, particularly suitable for being used in the expandable vinyl aromatic compositions, are high density polyethylene waxes characterized by a weight average molecular weight in the range of from (about) 500 to (about) 5000 Da.

Examples of talc, particularly suitable for being used in the expandable vinyl aromatic compositions, are these characterized by a median particle size comprised between (about) 1 µm and (about) 20 µm, preferably between (about) 5 µm and (about) 15 µm.

The foam cell regulator mixture is added in such a way that the final expandable vinyl aromatic polymer comprises between (about) 0.10 and (about) 1.0% by weight, preferably between (about) 0.10 and (about) 0.50% by weight and more preferably between (about) 0.15 and (about) 0.35% by weight of polyethylene wax and between (about) 0.25 and (about) 3.0% by weight and preferably between (about) 0.5 and (about) 2.0% by weight of talc.

The use of a molten vinyl aromatic polymer stream as a matrix for the coke particles allows a particular soft treatment of those particles during the dispersion process.

Alternatively, a masterbatch of vinyl aromatic polymer, in particular styrene polymer, comprising between (about) 20 and (about) 50% by weight of comminuted needle petroleum coke particles in the bimodal or trimodal particle size distribution, is prepared accordingly the above proper dispersion conditions.

The comminuted needle petroleum coke particles, as starting material, can be in a polymodal or a monomodal state and can later be transformed in a polymodal state as a dispersion in the polymer matrix. Polymodality can be generated by mixing several monomodal particle size distributions, by a suitable comminution or by a specific dispersion of monomodal or polymodal particle size distributions in the polymer matrix.

Subsequently the masterbatch along with vinyl aromatic polymer, in particular styrene polymer, and the other optional components are fed to the extruder in such an amount that the resulting extrudate, comprises between (about) 1 and (about) 10% by weight, preferably between (about) 2 and (about) 6% by weight with respect to the overall weight of the resulting extrudate, of platelet needle petroleum coke particles in the bimodal or trimodal particle size distribution.

The foams derived from the expanded vinyl aromatic polymers, in particular styrene polymers, comprising comminuted needle petroleum coke particles in the bimodal or trimodal particle size distribution, are used, not only because the thermal insulating effect is significantly improved, but also because they allow the addition of a reduced amount of fire retardant agent for the case that fire retardancy with B2 rating, in accordance to DIN 4102-1, is required.

The components that are used as the flame retardant agents—usually halogenated products—are relatively expensive, so that the molded bodies according to the invention, comprising comminuted petroleum coke particles in the bimodal or trimodal particle size distribution, are considerably less expensive and can also be produced so as to be more environmentally compatible.

The flame-retardant agents particularly suitable for being used in the expandable vinyl aromatic compositions are chlorinated and/or brominated polymers, aliphatic, cyclo-aliphatic and aromatic brominated compounds, such as hexabromocyclododecane, pentabromomonochlorocyclo hexane, tetrabromobisphenol A bis(allyl ether) and pentabromophenyl allyl ether; among the above, hexabromocyclododecane, tetrabromobisphenol A bis(allyl ether) and brominated polymers are preferred.

The flame-retarded polymer foams obtained from the vinylaromatic polymers of the present invention generally comprise, based on the polymer foam, an amount in the range from (about) 0.2 to (about) 10% by weight, preferably in the range from (about) 0.5 to (about) 6% by weight of aliphatic, cyclo-aliphatic and aromatic brominated compounds.

The flame-retarded polymer foams obtained from the vinylaromatic polymers of the present invention alternatively comprise, based on the polymer foam, an amount in the range from (about) 0.2 to (about) 25% by weight, preferably in the range from (about) 1 to (about) 15% by weight, of the halogenated polymers. Amounts of from (about) 5 to (about) 10% by weight, based on the polymer foam, ensure adequate flame retardancy, in particular for foams made of expandable polystyrene.

The weight average molecular weight, determined by means of gel permeation chromatography against polystyrene standards, of the halogenated, preferably brominated polymers, used as flame retardant, is preferably in the range from (about) 5 kDa to (about) 300 kDa, in particular from (about) 30 kDa to (about) 170 kDa.

The weight loss from the halogenated polymer in thermogravimetric analysis (TGA) is (about) 5% by weight at a temperature of (about) 250° C. or higher, preferably in the range from (about) 270 to (about) 370° C.

The bromine content of preferred halogenated polymers is in the range from (about) 20 to (about) 80% by weight, preferably from (about) 40 to (about) 80% by weight.

Halogenated polymers preferred as flame retardant are brominated polystyrene or styrene-butadiene block copolymer having bromine contents in the range from (about) 40 to (about) 80% by weight.

Other halogenated polymers preferred as flame retardant are polymers having tetrabromobisphenol A units (TBBPA), for example tetrabromobisphenol A diglycidyl ether compounds.

The effectiveness of the halogenated fire retardant agent can be still further improved via addition of suitable flame retardant synergists, examples being the thermal free-radical generators dicumyl peroxide, di-tert-butyl peroxide and dicumyl. Another example of suitable flame retardant synergist is antimony trioxide. Flame retardant synergists are generally used in amounts of from (about) 0.05 to (about) 5% by weight, based on the polymer foam, in addition to the halogenated flame retardant agent.

Expandable vinyl aromatic polymers are vinyl aromatic polymers comprising blowing agent. The vinyl aromatic polymer melt comprising blowing agent generally comprises, based on the vinyl aromatic polymer melt comprising blowing agent, a total proportion of from (about) 2% to (about) 10% by weight, preferably from (about) 3% to (about) 7% by weight, of one or more blowing agents distributed homogeneously. Suitable blowing agents are the physical blowing agents usually used in expandable styrene polymers e.g. aliphatic hydrocarbons having from 2 to 7 carbon atoms, alcohols, ketones, ethers, or halogenated hydrocarbons. Preferred blowing agents are isobutane, n-butane, isopentane, or n-pentane.

The expandable vinyl aromatic polymers further can comprise the usual and known auxiliaries and additives, examples being, fillers, UV stabilizers, chain-transfer agents, plasticizers, antioxidants, soluble and insoluble inorganic and/or organic dyes and pigments.

It is advantageous that the molded foams can have a density of less than (about) 20 kg/m$^3$, preferably less than (about) 16 kg/m$^3$.

The molded foam can exhibit a coefficient of thermal conductivity of (about) 35 mW/m·K or less and preferably of (about) 33 mW/m·K or less.

In previous patent application WO 2012/17534, it has been demonstrated that the appropriate choice of foam cell regulator, more specifically the right combination of polyethylene wax and talc is relevant to reach the aimed thermal conductivity (about 32 mW/m·K) for a molded foam with the preconceived low density (less than about 20 kg/m$^3$).

Various processes can be used to produce the particularly preferred expandable vinyl aromatic polymers, in particular the styrene polymers. After the polymerization process, the melt stream is divided into a main polymer stream (1) and an additional polymer side stream (2) (FIG. 1). The side stream constitutes a loop to take up the first additive package, for example coke and foam cell regulator, preferably talc and wax.

In a preferred embodiment, comminuted needle petroleum coke particles in the bimodal or trimodal particle size distribution are taken as starting point together with a mixture of talc and wax. These three components are simultaneously fed into the additional polymer side stream of the vinyl aromatic polymer via a mixing unit, preferably via an extruder. After dispersion of the first additive package, said additional polymer stream joins again the main polymer stream, both in the molten stage, preferably through a static mixer.

In another embodiment comminuted needle petroleum coke particles, in the monomodal particle size distribution, and the mixture of talc and wax, are simultaneously fed into the additional polymer side stream of the vinyl aromatic polymer via a mixing unit, preferably via an extruder. After dispersion of the monomodal comminuted needle petroleum coke particles the particle size distribution becomes polymodal.

The vinyl aromatic polymer melt comprising blowing agent, needle petroleum coke particles in the bimodal or trimodal particle size distribution, foam cell regulator, preferably talc and wax and in a later stage flame retardant agent and synergist, after homogenization, is rapidly cooled under pressure, in order to avoid foaming. It is therefore advantageous to carry out underwater pelletizing in a closed system under pressure.

Particular preference is given to a process for producing flame-retarded, expandable vinyl aromatic polymers, in particular styrene polymers, comprising the steps of:
a) producing a main polymer melt stream after the polymerization process;
b) introducing a blowing agent into said main polymer melt stream;
c) deriving a part of said main polymer melt stream and creating a main polymer melt stream and an additional polymer melt stream;
d) using an extruder at a temperature of at least 180° C. for incorporating the comminuted needle petroleum coke particles in the bimodal or trimodal particle size distribution and the mixture of talc and wax into the additional polymer melt stream;
e) merging the main and the additional polymer melt stream, containing the dispersed coke, wax and talc and forming a new main polymer melt stream;
f) introducing the flame retardant agent and the synergist into the new main polymer melt stream;
g) cooling the vinyl aromatic polymer melt comprising all necessary ingredients to a temperature of from (about) 120° C. to (about) 200° C.;
h) discharging through a die plate with holes, the diameter of which at the exit from the die is comprised between (about) 1 and (about) 2 mm, preferably about 1.5 mm;
i) pelletizing the melt comprising blowing agent directly downstream of the die plate under water at a pressure in the range from (about) 2 to (about) 20 bar, preferably in the range from (about) 5 to (about) 10 bar.

The pellets (beads, granules) can then further be coated and processed to give expanded vinyl aromatic polymer foams, in particular polystyrene foams.

In a first step, the expandable vinyl aromatic polymer pellets of the invention can be prefoamed by using hot air or steam, in what are known as prefoamers, to give foam beads of density in the range from (about) 8 to (about) 200 kg/m$^3$, in particular from (about) 10 to (about) 50 kg/m$^3$ preferably from (about) 10 to (about) 20 kg/m$^3$. In a second step the prefoamed beads are placed in molds, and retracted under pressure. After this retraction, they are treated with steam to partly melt the skin of the beads and once the pressure is released the prefoamed beads are fused in a closed mold to give molded foams.

EXAMPLES

The examples in Table 1 illustrate the invention; they are merely meant to exemplify the present invention but are not destined to limit or otherwise define the scope of the present invention.

In this table:
Column 1: indicates the identification number of the example.
Column 2: indicates the type and percentage of athermanous particle added to the extrudate wherein:
D is a dispersion of polymodal comminuted needle petroleum coke, obtained from proper dispersion conditions of comminuted needle petroleum coke, through extrusion in the additional polymer stream, obtained via derivation of a part of the main polymer melt stream (see FIG. 3).
MB is a masterbatch of polystyrene comprising 30% by weight of polymodal comminuted needle petroleum coke, obtained from improper extrusion conditions, creating fragmentation rather than delamination of bimodal comminuted needle petroleum coke (see FIG. 4).
Column 3: indicates the density of the foam (kg/m$^3$).
Column 4: indicates the thermal conductivity A (W/m·K) determined at 10° C. mean temperature according to DIN 52612.
Column 5: indicates the percentage of the total amount of the particles having a diameter of less than 3 μm.
Column 6: indicates the percentage of the total amount of the particles having a diameter comprised between 3 μm and 20 μm.

For all the examples 1% of talc (Luzenac 20 MO) and 0.5% by weight of polywax 2000 (Baker Hughes) was added to the polymer melt via extrusion.

All the examples comprise 1.4% by weight, on final extrudate, of hexabromocyclododecane and 0.33% by weight, on final extrudate, of 2,3-dimethyl-2,3-diphenylbutane (synergist). The foam panels derived all have B2 rating (DIN 4102).

TABLE 1

| Ex. | Athermanous Particle (% w) | Foam Density | Thermal Conductivity | % particles (<3 μm) | % particles (3-20 μm) |
|---|---|---|---|---|---|
| 1 | D1 (3.5) | 13.9 | 31.9 | 29 | 71 |
| 2 | D2 (3.5) | 15.8 | 32.4 | 24 | 51 |
| 3 | MB1 (3.5) | 14.5 | 34.9 | 44 | 55 |
| 4 | MB1' (3.5) | 15.0 | 35.5 | 48 | 49 |
| 5 | MB1 (4.0) | 13.5 | 34.8 | 46 | 53 |
| 6 | None | 15.3 | 38.2 | none | none |

As can be seen in Table 1, the addition of 3.5% by weight of comminuted needle petroleum coke (coke 1 and coke 2 respectively) via an extruder situated in the side polymer melt stream (Ex. 1 and Ex. 2) results in a polystyrene foam with decreased thermal conductivity compared to example 3, 4 and 5 where respectively is added:

(MB1): comminuted needle petroleum coke 1 at 3.5% by weight via a masterbatch prepared according to improper extrusion conditions;

(MB1'): comminuted needle petroleum coke 1 at 3.5% by weight via a masterbatch prepared according to improper extrusion conditions for which the extrusion conditions are worse compared to those of MB1;

(MB1): bimodal comminuted needle petroleum coke 1 at 4.0% by weight via a masterbatch prepared according to improper extrusion conditions similar to those of MB1;

wherein—coke 1 is Mechano REM 5 with a median diameter $d_{50}$ of 6.7 μm and coke 2 is Timcal PC 40 with a median diameter $d_{50}$ of 12.6 μm.

For the foam panels of example 1 and example 2, a thermal conductivity around 32 mW/m·K is measured. Coke 1 performs better than coke 2: a higher percentage of particles has a diameter comprised between 3 and 20 μm (71% for coke 1 versus 51% for coke 2). Besides coke 2 is characterized by a higher value for the median diameter (12.6 μm for coke 2 versus 6.7 μm for coke 1).

As appears from examples 3, 4 and 5, improper extrusion conditions result in an increased percentage of particles with a diameter less than 3 μm (44, 48 and 44% respectively) and a decreased percentage of particles with a diameter between 3 and 20 μm (55, 48 and 55 respectively).

These values should be compared with those for example 1 where the needle petroleum coke 1 is dispersed into the vinyl aromatic polymer accordingly the method of the present invention (dispersion into the polymer matrix, by addition into the molten polymer stream). For example 1 the percentage of particles with a diameter less than 3 μm (29%) is much smaller compared with the percentages for example 3, 4 and 5 (44, 48 and 44% respectively); on the contrary the percentage of particles with a diameter comprised between 3 and 20 μm (71%) is much higher than the percentages for example 3, 4 and 5. (55, 48 and 55 respectively).

The table clearly proves that improper extrusion conditions cause increased fragmentation and less delamination, as a consequence of which higher values for thermal conductivity of the derived foam panels are measured.

The invention claimed is:

1. Expandable vinyl aromatic polymers comprising platelet needle coke particles having a polymodal particle size distribution, wherein 45% or more of a total amount of the platelet needle coke particles have a diameter between 3 μm and 20 μm, and wherein 40% or less of the total amount of the platelet needle coke particles have a diameter of less than 3 μm.

2. The expandable vinyl aromatic polymers according to claim 1, wherein 60% or more of the total amount of the platelet needle coke particles have a diameter between 3 μm and 20 μm, and wherein 35% or less of the total amount of the platelet needle coke particles have a diameter of less than 3 μm.

3. The expandable vinyl aromatic polymers according to claim 1, wherein said polymodal particle size distribution is a bimodal or a trimodal distribution.

4. The expandable vinyl aromatic polymers according to claim 1, wherein the platelet needle coke particles are characterized by a BET of 20 $m^2$/g or less according to ASTM D-3037-93.

5. The expandable vinyl aromatic polymers according to claim 1, wherein the platelet needle coke particles have an aspect ratio between 1 and 200.

6. The expandable vinyl aromatic polymers according to claim 1, wherein the expandable vinyl aromatic polymers comprise between 1 and 10% by weight of the platlet needle coke particles having the polymodal particle size distribution.

7. The expandable vinyl aromatic polymers according to claim 1, wherein the expandable vinyl aromatic polymers comprise between 0.2 and 25% by weight of flame retardant agent, between 2 and 10% by weight of blowing agent, and between 0.01 and 5% by weight of foam cell regulator.

8. The expandable vinyl aromatic polymers according to claim 1, wherein the expandable vinyl aromatic polymers comprise between 0.2 to 25% by weight of flame retardant agent, between 2 and 10% by weight of blowing agent, between 0.1 and 1.0% by weight of polyethylene wax, and between 0.25 and 3.0% by weight of talc.

9. A process for the preparation of beads or granules of an expandable vinyl aromatic polymer comprising platelet needle coke particles having a polymodal particle size distribution, wherein 45% or more of a total amount of the platelet needle coke particle have a diameter between 3 μm and 20 μm, and wherein 40% or less of the total amount of the platelet needle coke particles have a diameter of less than 3 μm, the process comprising:

a) producing a main polymer melt stream after a polymerization process of the vinyl aromatic polymer;

b) introducing a blowing agent into said main polymer melt stream;

c) deriving a part of said main polymer stream and creating a side loop with an additional polymer melt stream;

d) dispersing comminuted needle petroleum coke particles and foam cell regulator into said additional polymer melt stream;

e) joining the additional polymer stream and the main polymer melt stream;

f) introducing flame retardant agent and synergist into the main polymer melt stream;

g) cooling the polymer melt down to a temperature lower than 200° C.;

h) discharging the polymer melt stream through a die plate with holes and pelletizing the polymer melt under water.

10. The process according to claim 9, wherein between 10 and 30% of the main polymer melt stream is derived in step c) to form the additional polymer melt stream.

11. The process according to claim 9, wherein, in step d), the comminuted needle petroleum coke particles and the foam cell regulator are dispersed in the additional polymer melt stream by means of an extruder.

12. The process according to claim wherein, in step f), the flame retardant agent and synergist are blended, in a separate extruder, with the vinyl aromatic polymer before being introduced in the main polymer melt stream, comprising the comminuted needle petroleum coke particles and the foam cell regulator.

13. Polymer foams obtained from the molding of expanded vinyl aromatic polymers according to claim 1.

14. The expandable vinyl aromatic polymers according to claim 1, wherein the platelet needle coke particles are characterized by a BET of 10 $m^2/g$ or less according to ASTM D-3037-93.

15. The expandable vinyl aromatic polymers according to claim 1, wherein the platelet needle coke particles are characterized by a BET of 5 $m^2/g$ or less according to ASTM D-3037-93.

16. The expandable vinyl aromatic polymers according to claim 1, wherein the platelet needle coke particles have an aspect ratio between 5 and 100.

17. The expandable vinyl aromatic polymers according to claim 1, wherein the platelet needle coke particles have an aspect ratio between 5 and 50.

18. The expandable vinyl aromatic polymers according to claim 1, wherein the expandable vinyl aromatic polymers comprise between 2 and 6% by weight of the platlet needle coke particles having the polymodal particle size distribution.

19. The expandable vinyl aromatic polymers according to claim 1, wherein the expandable vinyl aromatic polymers comprise between 1.0 and 15% by weight of flame retardant agent, between 3 and 7% by weight of blowing agent, between 0.1 and 0.5% by weight of polyethylene wax, and between 0.5 and 2.0% by weight of talc.

* * * * *